(12) United States Patent
Cilla Garcia et al.

(10) Patent No.: US 10,823,148 B2
(45) Date of Patent: Nov. 3, 2020

(54) WIND TURBINES AND METHODS

(71) Applicant: General Electric Renovables España, S.L., Barcelona (ES)

(72) Inventors: Javier Cilla Garcia, Barcelona (ES); Kevin Schoenleber, Barcelona (ES); Sergi Rates Palau, Barcelona (ES)

(73) Assignee: General Electric Removables Espana, S.L., Barcelona (ES)

( * ) Notice: Subject to any disclaimer, the term of this patent is extended or adjusted under 35 U.S.C. 154(b) by 0 days.

(21) Appl. No.: 16/520,469

(22) Filed: Jul. 24, 2019

(65) Prior Publication Data

US 2020/0032772 A1 Jan. 30, 2020

(30) Foreign Application Priority Data

Jul. 24, 2018 (EP) .................................. 18382558

(51) Int. Cl.
*F03D 9/25* (2016.01)
*H02P 9/34* (2006.01)
(Continued)

(52) U.S. Cl.
CPC ................ *F03D 9/255* (2017.02); *H02P 9/34* (2013.01); *F03D 7/0272* (2013.01);
(Continued)

(58) Field of Classification Search
CPC .......... F03D 7/0272; F03D 9/255; H02P 9/34; H02P 2101/15; F05B 2220/706; F05B 2270/335
(Continued)

(56) References Cited

U.S. PATENT DOCUMENTS 6,670,721 B2 * 12/2003 Lof .......................... H02J 3/381
290/44
7,880,335 B2 * 2/2011 Altenschulte ........... H02J 3/381
307/68

(Continued)

FOREIGN PATENT DOCUMENTS

EP 2 647 839 A2 10/2013
EP 2 662 561 A1 11/2013

OTHER PUBLICATIONS

EP Search Report, dated Feb. 5, 2019.

*Primary Examiner* — Pedro J Cuevas
(74) *Attorney, Agent, or Firm* — Dority & Manning, P.A.

(57) ABSTRACT

A wind turbine is provided. The wind turbine comprises: a generator (162), one or more power converters (20) arranged between the generator and a point of connection to a main transformer (5), and one or more wind turbine electrical components (8, 9, 10). The main transformer (5) is configured to connect a busbar (60) to an auxiliary wind turbine transformer, wherein the busbar is configured to receive electrical power from an electrical grid with a main voltage. The wind turbine electrical components are configured to be connected to the auxiliary wind turbine transformer (6), wherein a selection of the wind turbine electrical components is further configured to be connected to the busbar through a service voltage transformer (7) when the main transformer (5) is disconnected from the busbar. Systems comprising such wind turbines are also provided. Methods for connecting a wind turbine main transformer to a grid are also provided.

20 Claims, 4 Drawing Sheets

(51) Int. Cl.
*F03D 7/02* (2006.01)
*H02P 101/15* (2016.01)

(52) U.S. Cl.
CPC ... *F05B 2220/706* (2013.01); *F05B 2270/335* (2013.01); *H02P 2101/15* (2015.01)

(58) Field of Classification Search
USPC .................................................. 290/44, 55
See application file for complete search history.

(56) References Cited

U.S. PATENT DOCUMENTS

| | | | |
|---|---|---|---|
| 8,344,638 B2* | 1/2013 | Shteynberg ....... | H02M 3/33507 315/247 |
| 9,046,077 B2* | 6/2015 | Kirchner ................. | F03D 7/048 |
| 9,054,590 B2* | 6/2015 | Shteynberg ............ | H05B 45/37 |
| 9,584,028 B2* | 2/2017 | Shteynberg ............ | H05B 33/08 |
| 9,973,125 B2* | 5/2018 | Brogan .................. | H02P 21/50 |
| 9,998,050 B2* | 6/2018 | Brogan .................. | H02P 9/48 |
| 10,018,180 B2* | 7/2018 | Kjær .................... | F03D 7/0284 |
| 10,063,176 B2* | 8/2018 | Brogan .................. | F03D 9/255 |
| 2007/0108771 A1* | 5/2007 | Jones .................... | H02P 9/102 290/44 |
| 2009/0218817 A1* | 9/2009 | Cardinal ................. | F03D 7/048 290/44 |
| 2010/0026208 A1* | 2/2010 | Shteynberg ............ | H05B 33/08 315/297 |
| 2012/0101643 A1* | 4/2012 | Kirchner ................ | F03D 9/257 700/287 |
| 2012/0181879 A1* | 7/2012 | Andresen ............... | H02J 3/381 307/151 |
| 2013/0088078 A1* | 4/2013 | Shteynberg ............ | H05B 33/08 307/31 |
| 2013/0229056 A1 | 9/2013 | Teichmann | |
| 2014/0103654 A1* | 4/2014 | Kosaka .................. | F03D 7/048 290/44 |
| 2015/0108755 A1* | 4/2015 | Das ....................... | F01D 15/10 290/43 |
| 2015/0137520 A1* | 5/2015 | Garcia ................... | H02J 3/381 290/44 |
| 2015/0311808 A1* | 10/2015 | Shteynberg ....... | H02M 3/33507 315/307 |
| 2017/0009743 A1* | 1/2017 | Brogan .................. | F03D 9/255 |
| 2017/0009744 A1* | 1/2017 | Brogan .................. | H02J 3/36 |
| 2017/0009745 A1* | 1/2017 | Brogan .................. | F03D 9/257 |
| 2019/0157980 A1* | 5/2019 | Ji .......................... | H05B 6/685 |
| 2020/0127460 A1* | 4/2020 | Djan-Sampson ....... | H02J 3/381 |
| 2020/0127461 A1* | 4/2020 | Djan-Sampson ....... | H02J 3/381 |

* cited by examiner

WIND TURBINES AND METHODS

The present disclosure relates to a wind turbine comprising electrical components and to systems comprising such wind turbines. The present disclosure further relates to methods for connecting a wind turbine main transformer to a grid, in particular when the wind turbine main transformer has previously been disconnected from the grid.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid via transformers.

Wind turbines may be arranged together forming a wind park, with a single point of connection to the electrical grid, i.e. the PCC ("Point of Common Coupling"). Wind parks may comprise a substation including e.g. wind park transformers that convert power from the wind park voltage to a grid voltage. Such a substation may further include wind park control systems e.g. a supervisory control and data acquisition system (SCADA).

Wind parks may be arranged on land ("onshore"), or in the water ("offshore"), either as a plurality of floating wind turbines or with wind turbines on pillars fixed in the sea bed.

In wind turbines, there are electrical components which are required to operate continuously, even during stand-by situations. These components may include components related to air conditioning systems, sensors, PLCs, beacons and protective systems among others.

There are also components which are less critical. These components may be required to operate only occasionally during stand-by situations. These components may include lubrication pumps, lighting systems, the service lift, pitch and yaw systems among others.

In summary, power supply must always be available for at least some of the electrical components forming part of a wind turbine. And for some other electrical components, power supply may need to be ensured intermittently.

However, connection with the grid may be lost during planned maintenance, or during installation. Additionally, sometimes the wind turbine has to be stopped for an inspection and the connection of the transformer to the grid has to be cut. Wind turbines that are disconnected from the medium voltage or high voltage collector system for repair or maintenance work cannot provide electrical power. In these cases one or more auxiliary power sources may be provided for most of the electrical components.

For example, a plurality of auxiliary power generators e.g. diesel generators may be installed at individual wind turbines to be able to supply power to each wind turbine individually. Or alternatively, at least one more powerful auxiliary power generator may be provided at the central substation supplying all wind turbines simultaneously.

Additionally, when the grid comes back after a grid disconnection, the voltage at a DC-link forming part of the wind turbine may be at or close to zero volts. Once the grid is connected back to the wind turbine, the DC-link and the wind turbine main transformer which is connected to the DC-link are energized in a very short time, thus resulting in very high in-rush currents which can be unacceptable to the collector grid, and can damage the transformer and electronic components within the DC-link. For such systems, inrush current protection devices may be needed in order to overcome these drawbacks.

One further known approach is disclosed in EP2647839. This document discloses that when a turbine is in regular operation, a main power circuit may be energized and connected to power grid by way of a first current interrupting element, and electrical power may be provided from a DFIG (Doubly Fed Induction Generator) to the power grid. Furthermore, in regular operation, an auxiliary circuit may be energized and connected to a junction by way of a second current interrupting element. Electrical power can thus be provided from DFIG to auxiliary components, with the electrical power from main power transformer being converted to the appropriate voltage by auxiliary transformer.

However, during maintenance operations, the DFIG may be shut down, and the main power circuit may be isolated from the power grid. This can de-energize the wiring, assemblies, and components of the main circuit, thereby reducing the risk of electrocution during maintenance operations. However, when the main circuit is isolated, the auxiliary circuit may remain connected to the power grid by way of a junction and a second current interrupting element. Power can thus be back-fed from the grid to the auxiliary transformer, and to the auxiliary components of wind turbine.

However, this approach is not a cost-effective solution since it may include costly elements e.g. a 66 kV circuit breaker for disconnecting an auxiliary transformer from the busbar and the auxiliary transformer arranged to convert power from 66 kV as delivered from the grid to a suitable power for the electrical components.

SUMMARY

In a first aspect, a wind turbine is provided. The wind turbine comprises: a generator, one or more power converters arranged between the generator and a point of connection to a main transformer and one or more wind turbine electrical components. The main transformer is configured to connect a bus bar to an auxiliary wind turbine transformer, and the busbar is configured to receive electrical power from an electrical grid with a main voltage. Moreover, one or more of the wind turbine electrical components are configured to be connected to the auxiliary wind turbine transformer and a selection of the wind turbine electrical components is further configured to be connected to the busbar through a service voltage transformer when the main transformer is disconnected from the busbar.

According to this first aspect, electrical power is provided to a selection of the wind turbine electrical components using the service voltage transformer, particularly when the main transformer is disconnected from the busbar.

The electrical power consumed by the wind turbine components during normal operation is either supplied by the electrical grid (e.g. if there is no wind) or supplied by the wind turbine itself (e.g. if there is wind and the wind turbine is generating electrical power).

In normal operation, specifically when the electrical grid provides electrical power, the main transformer and the auxiliary transformer are used for lowering a relatively high voltage supplied by the electrical grid such that a suitable electrical power is fed to the electrical components of the wind turbine.

However, when the main transformer is disconnected from the busbar (e.g. due to maintenance), the main transformer does not receive electrical power from the electrical grid and it can thus not provide electrical power to the electrical components. The selected electrical components may thus be connected to the busbar such that electrical power is received by the selected electrical components, in response to the disconnection of the main transformer, via the service voltage transformer.

In summary, particularly when the main transformer is disconnected from the grid, the service voltage transformer is used for lowering a relatively high power supplied by the electrical grid such that a suitable electrical power is fed to a selection of the electrical components of the wind turbine.

In a second aspect, a method for connecting a disconnected a wind turbine main transformer to a grid is provided. The method comprises connecting the grid to a primary winding of a service voltage transformer via a busbar to supply power to a pre-charge circuit. The method further comprises: pre-energizing a secondary winding of the main transformer with the pre-charge circuit while a primary winding of the transformer is disconnected from the grid and connecting the primary winding of the wind turbine main transformer to the grid when a primary winding is in phase with the grid.

According to this aspect, a method for connecting the wind turbine main transformer to the grid is provided in which electrical power can be supplied to the pre-charge and pre-energizing circuit, when the main transformer has previously been disconnected from the grid.

Therefore, when the grid is connected back to the transformer, the main transformer is pre-energized using the pre-charge circuit such that inrush currents are reduced. Accordingly, mechanical loads of the windings of the transformer may at least be reduced and further resonances and/or oscillations of the electric system formed by the wind turbine and grid may be reduced or avoided.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
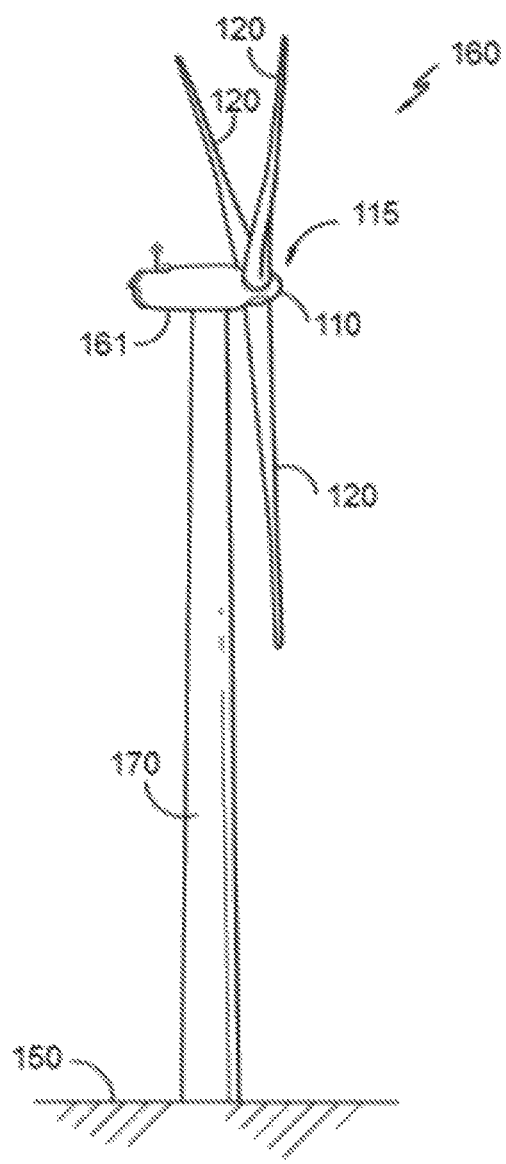
FIG. 1 illustrates a perspective view of one example of a wind turbine.

Reference will now be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In these figures the same reference signs have been used to designate matching elements.

Throughout the present description and claims the term "breaker" or "circuit breaker" may be defined as device that can be operated in load and short circuit conditions. The term "load switch" may be defined as a device that can be operated with rated current. The term "no load switch" may be defined as a device that cannot be operated with load only with voltage. It is noted that all these devices may be operated remotely.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
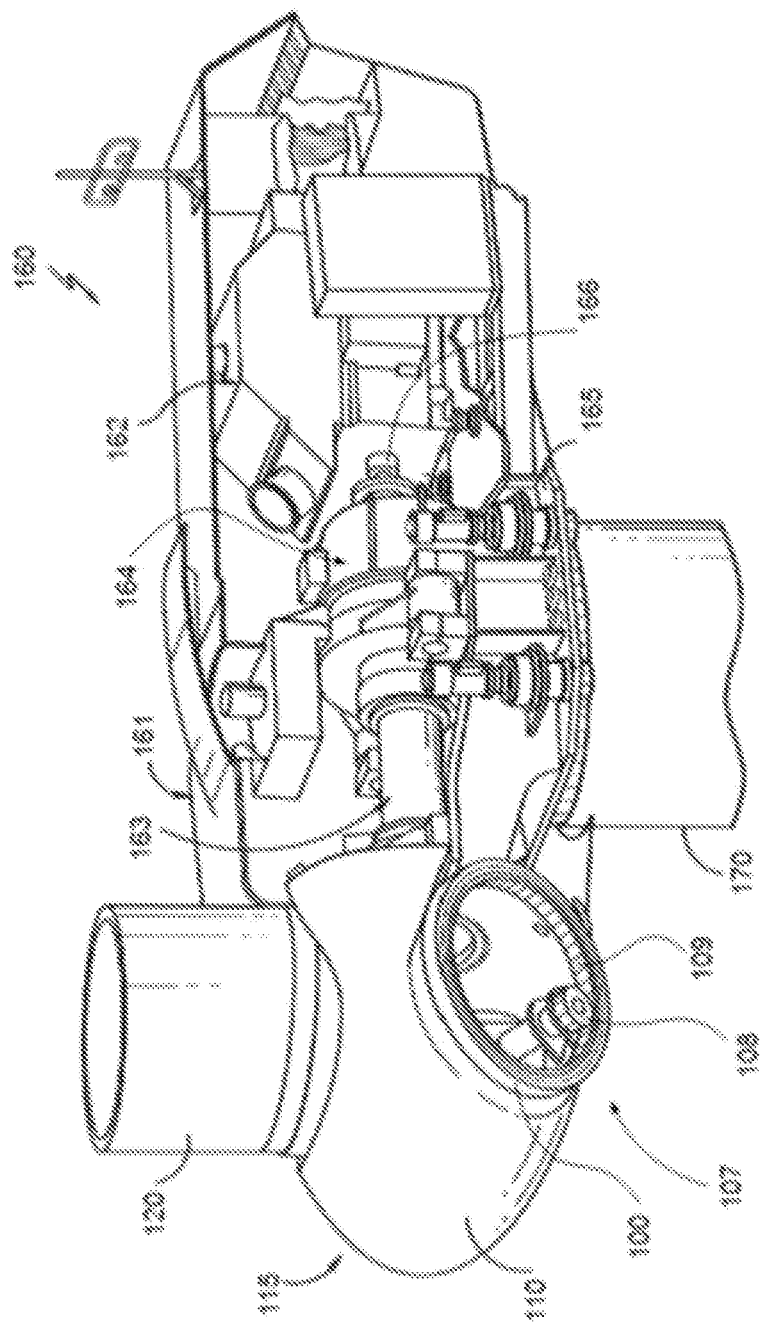
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that mesh with an annular gear 109 provided on the inner bearing ring to set the wind turbine blade into rotation.

Figure 3:
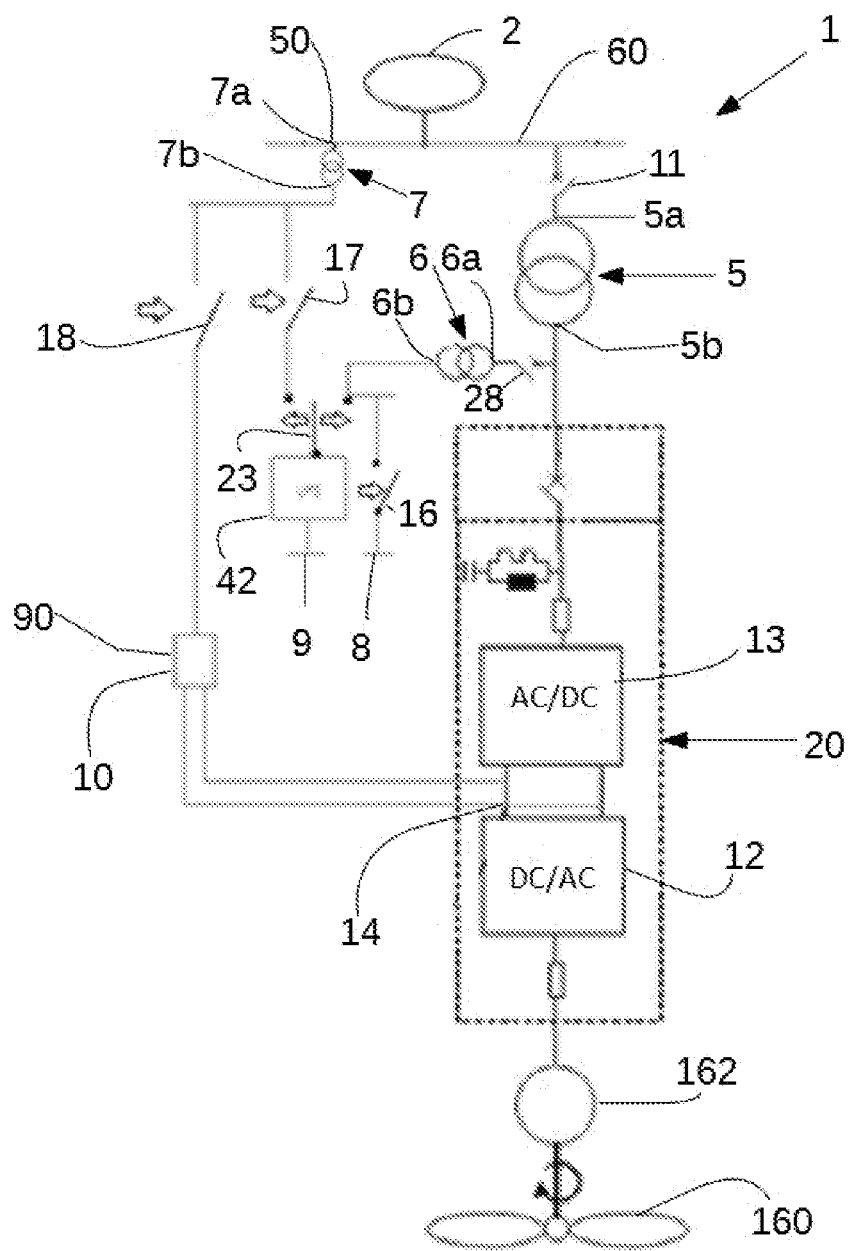
FIG. 3 schematically illustrates an example of a system for providing electrical power to one or more wind turbine components.

FIG. 3 schematically illustrates an example of a system for providing electrical power to one or more wind turbine components. FIG. 3 shows a system 1 comprising an electrical grid 2 e.g. a transformer of a substation connecting an offshore wind park to a high voltage transmission line (either High Voltage DC or High Voltage AC).

The electrical grid 2 may be connected to a busbar 60. The electrical grid 2 is configured to provide electrical power to the busbar 60 with a main voltage.

The system 1 further comprises a wind turbine 160. The wind turbine may be e.g. an offshore wind turbine. The wind turbine 160 comprises a converter 20 and a wind turbine generator 162. In examples, the wind turbine generator is driven by a full power converter. The wind turbine 160 may further comprise a main transformer 5 including a primary winding 5a and a secondary winding 5b.

In examples, the main transformer 5 may form part of the wind turbine. However, in some other examples, the main transformer may be external to the wind turbine.

The primary winding 5a of the main transformer 5 is connected to the busbar 60 and thus is arranged to receive electrical power from the electrical grid 2. The secondary winding 5b of the main transformer 5 is configured to deliver electrical power to the converter 20.

The converter 20 may comprise a machine-side converter 12 e.g. an AC-DC converter and a grid-side converter 13 e.g. a DC-AC converter. The machine-side converter 12 may be electrically connected to the generator 162. Moreover, the grid-side converter 13 may be electrically coupled a point of connection of the secondary winding 5b of the main transformer 5. The machine side converter 13 and the grid side converter 14 are configured for normal operating mode in a three-phase, pulse width modulation (PWM) arrangement using e.g. insulated gate bipolar transistors (IGBT) switching elements. Machine side converter 13 and grid side converter 14 may be coupled via a DC link 14.

In the wind turbine 160, electrical components may be categorized into three levels, as follows: Level 1 electrical components are those components which may be considered critical. These level 1 components are required to have un-interrupted operability, even during stand-by situations, i.e. when the wind turbine is disconnected from the electrical grid, and no electrical power is thus available. These level 1 component may for this reason be connected to an Uninterrupted Power Supply (UPS).

Level 1 electrical components may include components related to communication, and control and manoeuver of a gas insulated switchgear (GIS). It may further include air conditioning systems, sensors, PLCs, beacons and protective systems among others.

Level 2 electrical components may include those components which are less critical; these components may be required to operate only occasionally e.g. only during stand-by situations. Level 2 components may include lubrication pumps, lighting systems, inrush current protection systems, uninterruptable power supply units, sockets, the service lift, among others.

Finally, level 3 electrical components may not be required to operate during stand-by situations but may be operated when the wind turbine is operating normally. Level 3 components may include e.g. lubrication pumps, cooling systems, among others.

In this respect, an auxiliary transformer 6 is arranged that delivers electrical power to a first set of electrical components 8. The first set of electrical components may comprise level 3 electrical components i.e. components which are not required to be operated in situations wherein the main transformer 5 is disconnected from the busbar 60.

The auxiliary transformer 6 may further be arranged that delivers electrical power to a second set of electrical components 9. The second set of electrical components may comprise level 1 electrical components i.e. components which are required to operate continuously, even when the wind turbine is disconnected from the electrical grid.

Similarly as the main transformer, the auxiliary transformer may form part of the wind turbine. However, in some other examples, the auxiliary transformer may be external to the wind turbine.

An uninterruptible power supply 42 (UPS) may be added to the second set of electrical components 9. In case the main transformer 5 is disconnected from the grid 2, the uninterruptable power supply associated with the second set of electrical component may continue to function for e.g. approximately 30 minutes. However beyond these 30 minutes, the grid will have to deliver the required power via e.g. a service voltage transformer 7 as will be explained later on.

Following the example, the auxiliary wind turbine transformer 6 comprises a primary winding 6a and a secondary winding 6b. The primary winding 6a is configured to receive electrical power from the main transformer 5 and the secondary winding 6b is configured to deliver electrical power to the first set of the electrical components 8 and/or the second set of electrical components 9 (via the UPS 42).

A breaker 28 may be provided for disconnecting the auxiliary wind turbine transformer 6 to the main transformer 5.

A further breaker 11 may be arranged upstream of the main transformer 5 for disconnecting the main transformer 5 from the busbar 60. A control signal that orders circuit breaker 11 to disconnect the main transformer from the busbar 60 may be generated at the level of a supervisory control and data acquisition system (SCADA) of a wind park and it may be sent to the circuit breaker 11.

Additionally, the above-commented service voltage transformer 7 including a primary winding 7a and a secondary winding 7b may be provided. In examples, the service voltage transformer 7 may form part of the wind turbine. However, in some other examples, the service voltage transform may be external to the wind turbine.

The primary winding 7a of the service voltage transformer 7 is connected to the busbar 60 and thus is arranged to receive electrical power from the electrical grid 2. The secondary winding 7b of the service voltage transformer 7 is configured to deliver electrical power to the second set of electrical component 9 via the UPS 42 and a third set of electrical components 10.

In this respect, the UPS 42 is configured to selectively receive electrical power from the secondary winding 6b of the auxiliary transformer 6 or from the secondary winding 7b of the service voltage transformer 7 depending on whether the main transformer is connected or not from the busbar as will be explained later on. This may be performed using a switch 23. The switch 23 may be configured for alternately connecting the second set of wind turbine electrical components 9 to the service voltage transformer 7 or to the auxiliary wind turbine transformer 6 via the UPS.

The third set of electrical components may comprise Level 2 electrical components i.e. components required to operate only during situations wherein the main transformer has been disconnected from the grid.

A switch 50 e.g. a "load switch" or a "no load switch" for disconnecting the service voltage transformer 7 from the grid 2 may also be provided. It is noted that the use of the proposed switch is more cost-effective than conventional alternatives e.g. a circuit breaker, which may include costly structures, particularly when the electrical power provided by the grid may be at the most at 66 kV and for relatively small substation. In this respect, the provision of a circuit breaker may be economical only above 66 kV which is not the current case. Moreover, the replacement of such conventional circuit breaker may be relatively time-consuming.

In some examples wherein the electrical power provided by the electrical grid is 33 kV, a fuse may be provided for disconnecting the service voltage transformer 7 from the grid 2, which is an even more cost-effective solution.

Additionally, switches 16, 17, 18 e.g. "load switches" or "no load switches" may be arranged for the first set, the second set and the third set of electrical components. The corresponding switch may be opened in case the main transformer is disconnected from the busbar or connected to the busbar, and only selectively closed so that only power is delivered to those components, using either the main transformer or the service voltage transformer, when needed.

The third set of electrical components 10 may include an inrush current protection device e.g. a pre-charge circuit 90. A problem with the inrush currents is that when the grid comes back after a grid loss, the transformer of the wind turbine may be suddenly energized. This may result in a very high inrush current peak. Accordingly, the main transformer may be disconnected from the grid due to an unwanted protection relay tripping. Furthermore, the inrush current peak may lead to resonances and/or oscillations in the power distribution system and/or to high mechanical loading of the transformer windings which may result in reduced transformer lifetime.

A solution for these drawbacks may be the provision of the above-commented pre-charge-circuit 90 which can be powered even if the main transformer (and the wind turbine generator) is offline. The pre-charge circuit 90 may be electrically connected to the DC-link 14 (and thus the converter 20). The pre-charge circuit 10 may thus further be indirectly connected to the secondary winding 5b of the main transformer 5 via the converter 20, particularly via the inverter 13 forming part of the converter 20.

The pre-charge circuit 90 is configured to charge the converter and the secondary winding 5b of the transformer 5, respectively, when the main transformer 5 is disconnected from the grid 2. Accordingly, the pre-charge circuit through the DC-link may pre-magnetize/pre-energize the secondary winding of the main transformer 5 prior the main transformer is connected back to the grid e.g. via the breaker 11 after a disconnection of the main transformer from the grid. It is noted that throughout the present description and claims the term "pre-magnetize" and the term "pre-energize" may be used interchangeably. These terms refer to the pre-magnetization/pre-energization of the wind turbine transformer via a pre-charged DC-link forming part of a wind turbine converter. In doing so, inrush currents may be avoided or at least reduced when the primary winding 5a of the transformer 5 is connected to the grid 2. Accordingly, mechanical loads of the windings of transformer may at least be reduced and further resonances and/or oscillations of the electric system formed by wind turbine 160 and external grid 2 may be reduced or substantially avoided.

After pre-magnetizing the secondary winding 5b of the transformer 5 using the pre-charge circuit 90, the pre-charge circuit 90 may send a signal to the circuit breaker 11 to connect the grid 2 and the primary winding of the transformer 5. For this purpose at least one signal line (not shown), for example a TTL-line or a LAN-cable, is arranged between the pre-charge circuit 90 and the breaker 11. It is noted that the signal may be sent to the circuit breaker when the primary winding of the transformer is substantially in phase with the grid as will be described later on.

The pre-charge circuit 90 may also be connected via at least one signal line with a turbine controller to exchange information. For example, the turbine controller may issue the command to close the breaker 11 via the pre-charge circuit 10. Accordingly, a SCADA system connected with or running on turbine controller may switch several wind turbines after each other back to the grid formed by a wind park grid. Accordingly, inrush currents may be even further reduced.

The pre-charge circuit 90 may include an energy buffer, for example a capacitor, to provide in a comparatively short time of about several milliseconds to about several seconds enough electrical energy to charge the wind turbine transformer 5 via the inverter 13 of the converter as hereinbefore described.

In any event, the secondary winding of the transformer 5b is magnetized with the energy buffered in the pre-charge circuit while the primary winding of the main transformer remains disconnected from the grid. This may be performed such that the primary winding of the transformer 5 is in defined phase relation, for example substantially in phase with the grid 2.

Due to magnetizing the transformer prior to connecting primary winding of the transformer 5 back to the grid 2 and also considering that the breaker is closed when the primary winding of the transformer is substantially in phase with the grid, inrush currents are avoided or at least substantially reduced. The life time of the transformer 5 may be increased. Furthermore, oscillations and/or resonances of current and/or voltage of the transformer-grid system may be avoided.

In accordance with an aspect, electrical power may be supplied to one or more wind turbine electrical components substantially as follows:

In normal operation i.e. when the grid supplies electrical power, the electrical grid may be connected to the primary winding 5a of the main transformer 5. The main transformer 5 may thus convert power from 66 kV as delivered from the grid to a voltage level of the secondary winding of the main transformer, e.g. 3.3 kV.

A control signal that orders the switch 23 to connect the UPS 42 and the second set of electrical components 9 to the auxiliary transformer 6 may be generated at the level of a supervisory control and data acquisition system (SCADA) of a wind park and it may be sent to the switch 23.

The auxiliary wind turbine transformer 6 will further transform the power from the voltage level of the secondary winding of the main transformer to the voltage level required by the first set of electrical components 8 and the second set of electrical components of the wind turbine 9 via the uninterruptible power supply 42. This voltage level may be 0.4 kV.

It is thus clear that, in the above-commented normal operation, the first set of electrical components 8 and the second set of electrical components 9 may be connected to the grid via the main transformer 5 and the auxiliary transformer 6 and they may suitably be fed using such transformers.

It is noted that, in normal operation, electrical power is not supplied to the third set of electrical component e.g. the pre-charge circuit 10. The reasoning is that the main transformer is connected to the grid. Therefore, no high inrush current peak may occur by connecting the transformer to the grid and thus the pre-charge circuit is not necessary at this stage.

However, when the main transformer 5 is disconnected from the grid 2 using e.g. the circuit breaker 11, the electrical grid may be connected to the primary winding 7a of the service voltage transformer 7 via e.g. the switch 50.

A control signal that orders the switch 23 to connect the second set of electrical components 9 to the service voltage transformer 7 due to the disconnection of the main transformer 5 from the grid 2 may be generated at the level of a supervisory control and data acquisition system (SCADA) of a wind park and it may be sent to the switch 23. In some examples, the disconnection of the main transformer 5 from the grid 2 may also be detected locally, e.g. through a sustained absence of electrical power in the primary winding of the main transformer. In any event, the switch 23 may be activated such that the second set of electrical components is connected to the service voltage transformer 7.

The service voltage transformer 7 may thus convert power from 66 kV as delivered from the grid to the voltage level required by the second set of electrical components 8 and the third set of electrical components of the wind turbine 9. This voltage level may be 0.4 kV.

As illustrated here, regardless of whether the power is delivered by the grid via the main transformer and the auxiliary transformer or via the service voltage transformer, power is supplied to the second set of electrical component i.e. electrical components which always need power supply and the interruption of the operation cannot be accepted.

Additionally, in case the main transformer 5 is disconnected from the grid 2 and the busbar 60, power is supplied to the pre-charge circuit 90. As a result, the transformer 5 may be energized via the converter 20 in a substantially similar manner as hereinbefore described. In case the main transformer 5 is connected back to the grid, an inrush current may almost or even completely be avoided.

Figure 4:
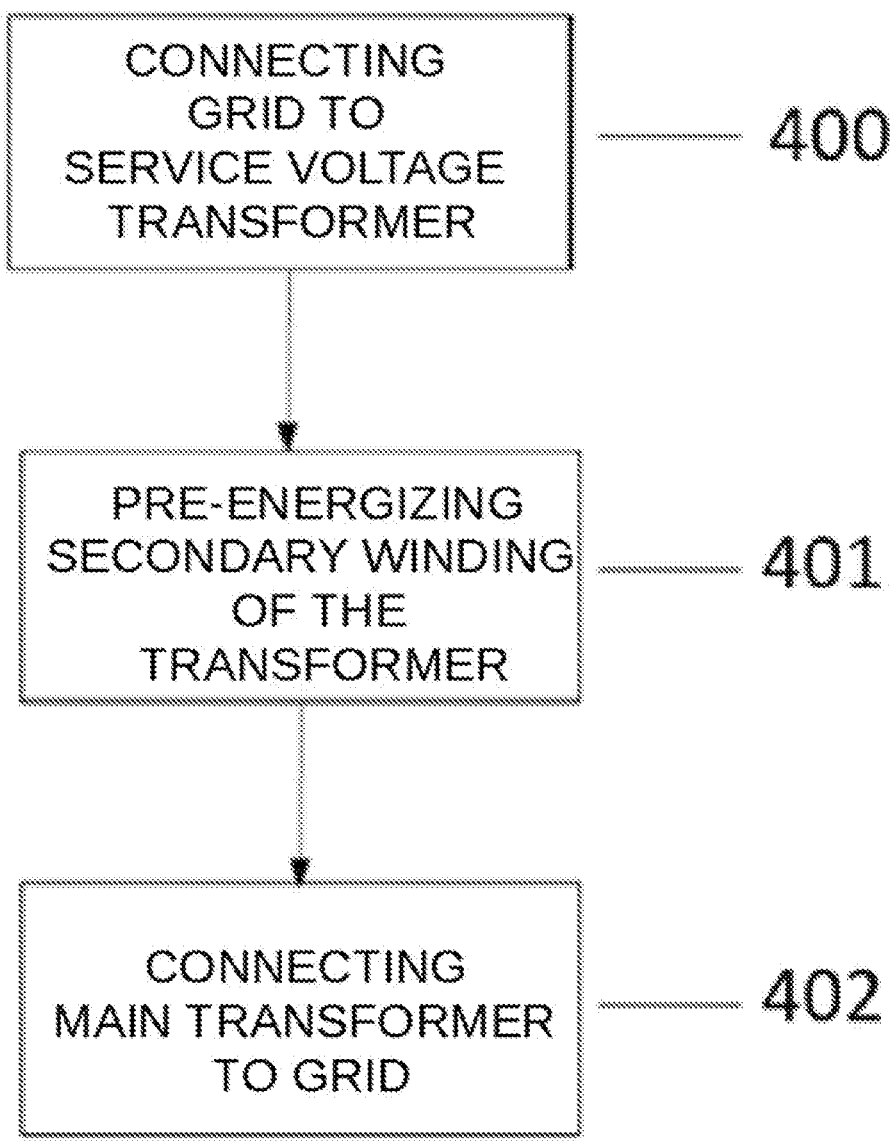
FIG. 4 is an illustration of a block diagram describing an example of a method for providing electrical power to one or more wind turbine components.

FIG. 4 is an illustration of a block diagram describing an example of a method for connecting a disconnected wind turbine main transformer to a grid.

A system for providing electrical power to one or more wind turbine components as hereinbefore described may be provided, in particular to provide electrical power to a pre-charge circuit.

At block 400, primary winding of a service voltage transformer may be connected to the grid via a busbar to supply power to a pre-charge circuit. The service voltage transformer may thus convert power from 66 kV as delivered from the grid to the voltage level required by the pre-charge circuit. This voltage level may be 0.4 kV. In any case, energy is buffered in such pre-charge circuit.

At block 401, a secondary winding of the transformer is pre-energized with the pre-charge circuit while a primary winding of the transformer is disconnected from the grid. This is typically done such that the primary winding of the transformer is in defined phase relation, for example substantially in phase with the grid.

In some examples, a voltage of the secondary winding of the transformer may be ramped up to a predefined value, for example up to a rated voltage of the generator or close to the rated voltage of the generator.

At block 402, the primary winding of the transformer and the grid are connected when the primary winding of the transformer is substantially in phase with the grid. Due to pre-energizing the transformer prior to connecting its primary winding back to the grid, inrush currents are avoided or at least substantially reduced. Accordingly, life time of the transformer may be increased. Furthermore, oscillations and/or resonances of current and/or voltage of the transformer-grid system may be avoided.

In a first aspect, a wind turbine is provided. The wind turbine comprises: a generator, one or more power converters arranged between the generator and a point of connection to a main transformer. The wind turbine further comprises one or more wind turbine electrical components, wherein the main transformer is configured to connect a bus bar to an auxiliary wind turbine transformer, wherein the busbar is configured to receive electrical power from an electrical grid with a main voltage. Moreover, one or more of the wind turbine electrical components are configured to be connected to the auxiliary wind turbine transformer and a selection of the wind turbine electrical components is further configured to be connected to the busbar through a service voltage transformer when the main transformer is disconnected from the busbar.

In further examples, the auxiliary wind turbine transformer may be configured to connect the main transformer to a first set of wind turbine electrical components. Additionally, the service voltage transformer may be configured to connect the busbar to a second set of wind turbine electrical components. The auxiliary wind turbine transformer and the service voltage transformer may be both configured to connect to the second set of wind turbine electrical components.

In examples, the service voltage transformer is configured to connect the busbar to a third set of electrical components. This third set of electrical components may include a pre-charge circuit to pre-charge a DC-bus of the converters.

In some examples, the wind turbine electrical components are divided into two or more different levels, wherein the first level is defined for electrical components requiring substantially permanent operability, wherein the first level of electrical components includes the second set of wind turbine electrical components.

In examples a second level of electrical components may be defined for electrical components that substantially only require operability when the main transformer is disconnected from the busbar, wherein the second level includes the third set of electrical components. A third level is further defined for electrical components that do not require operability when the main transformer is disconnected from the busbar, wherein the third level includes the first set of electrical components.

In example, a system is provided. The system comprising a busbar, an electrical grid for providing electrical power to the busbar with a main voltage, a wind turbine as hereinbefore described, a main transformer for connecting the wind turbine to the busbar, an auxiliary wind turbine transformer for connecting the main transformer to one or more of the wind turbine electrical components. The system further comprising: a service voltage transformer for connecting the busbar to the selection of the wind turbine electrical components when the main transformer is disconnected from the busbar.

In examples, the system further comprises a circuit breaker for disconnecting the main transformer to the busbar.

In some examples, the service voltage transformer forms part of the wind turbine.

In examples, the main transformer comprises a primary winding and a secondary winding, wherein the primary winding is configured to receive electrical power from the busbar and the secondary winding is configured to deliver electrical power to the converters, wherein the auxiliary wind turbine transformer comprises a primary winding and a secondary winding, wherein the primary winding is configured to receive electrical power from the main transformer and the secondary winding is configured to deliver electrical power to a first set of electrical components.

In further examples, the service voltage transformer comprises a primary winding and a secondary winding, wherein the primary winding is configured to receive electrical power from the busbar and the secondary winding is configured to deliver electrical power to a second set of electrical components.

In some other examples, the system comprises an uninterruptable power supply, wherein the uninterruptable power supply is configured to selectively receive electrical power from the auxiliary transformer or from the service voltage transformer.

In some other examples, the system further comprises a switch or a fuse for disconnecting the service voltage transformer from the grid. In examples, the second set of wind turbine electrical components is configured to be alternatively connected to the service voltage transformer or to the auxiliary wind turbine transformer using a switch.

In a further aspect, a method for connecting a disconnected a wind turbine main transformer to a grid is provided. The method comprises: connecting the grid to a primary winding of a service voltage transformer via a busbar to supply power to a pre-charge circuit. The method further comprises: pre-energizing a secondary winding of the main transformer with the pre-charge circuit while a primary winding of the transformer is disconnected from the grid, and connecting the primary winding of the main transformer to the grid when the primary winding of the transformer is substantially in phase with the grid.

In examples, the secondary winding of the transformer may be pre-energized by ramping a voltage of the secondary winding of the transformer until a predefined value is reached.

In a further aspect, a wind turbine is provided. The wind turbine comprises a generator, one or more power converters arranged between the generator and a point of connection to a main transformer, wherein the main transformer is configured to connect a bus bar to the converters, wherein the busbar is configured to receive electrical power from an electrical grid with a main voltage. The wind turbine further comprises: a pre-charge circuit configured to be connected to the busbar through a service voltage transformer when the main transformer is disconnected from the busbar, wherein the pre-charge circuit is configured to apply electrical power to a DC bus of the converter such that a secondary winding of the main transformer is pre-charged and a primary winding of the transformer is substantially in phase with the grid.

In examples, a system may be provided. The system comprises a busbar, an electrical grid for providing electrical power to the busbar with a main voltage, a wind turbine according to the above-commented aspect, a main transformer for connecting the wind turbine to the busbar. The system further comprising: a service voltage transformer for connecting the busbar to the precharge-circuit when the main transformer is disconnected from the busbar.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A wind turbine, comprising:
   a generator;
   one or more power converters arranged between the generator and a point of connection to a main transformer, the main transformer configured for connecting a bus bar that receives electrical power from an electrical grid having a main voltage to an auxiliary wind turbine transformer;
   one or more of wind turbine electrical components configured for connecting to the auxiliary wind turbine transformer; and
   wherein a selection of the wind turbine electrical components are configured for connecting to the bus bar through a service voltage transformer when the main transformer is disconnected from the busbar.

2. The wind turbine according to claim 1, wherein a first set of the wind turbine electrical components are connectable to the main transformer through the auxiliary wind turbine transformer.

3. The wind turbine according to claim 2, wherein a second set of the wind turbine electrical components are connectable to the bus bar through the service voltage transformer.

4. The wind turbine according to claim 3, wherein the second set of the wind turbine electrical components are connectable to the bus bar through both of the auxiliary wind turbine transformer and the service voltage transformer.

5. The wind turbine according to claim 4, wherein a third set of the wind turbine electrical components are connectable to the bus bar through the service voltage transformer.

6. The wind turbine according to claim 5, wherein the third set of the wind turbine electrical components includes a pre-charge circuit to pre-charge a DC-bus of the power converters.

7. The wind turbine according to claim 3, wherein the wind turbine electrical components are divided into two or more different levels, wherein a first level is defined for wind turbine electrical components requiring permanent operability and includes the second set of wind turbine electrical components.

8. The wind turbine according to claim 5, wherein the wind turbine electrical components are divided into two or more different levels, wherein:
   a first level is defined for wind turbine electrical components requiring permanent operability and includes the second set of wind turbine electrical components;
   a second level is defined for wind turbine electrical components that only require operability when the main transformer is disconnected from the busbar and includes the third set of wind turbine electrical components; and
   a third level is defined for wind turbine electrical components that do not require operability when the main transformer is disconnected from the busbar and includes the first set of wind turbine electrical components.

9. A system comprising:
   an electrical grid with a main voltage;
   a bus bar, the electrical grid providing electrical power to the bus bar;
   a main transformer;

an auxiliary wind turbine transformer, the main transformer configured to connect the bus bar to the auxiliary wind turbine transformer;
a service voltage transformer;
a wind turbine, the wind turbine further comprising:
   a generator;
   one or more power converters arranged between the generator and a point of connection to the main transformer,
   one or more of wind turbine electrical components configured for connecting to the auxiliary wind turbine transformer; and
   wherein a selection of the wind turbine electrical components are configured for connecting to the bus bar through the service voltage transformer when the main transformer is disconnected from the bus bar.

10. The system according to claim 9, further comprising a circuit breaker disposed to disconnect the main transformer to the bus bar.

11. The system according to claim 9, wherein the service voltage transformer forms part of the wind turbine.

12. The system according to claim 9, wherein:
the main transformer comprises a primary winding and a secondary winding, wherein the primary winding is configured to receive electrical power from the bus bar and the secondary winding is configured to deliver electrical power to the power converters; and
the auxiliary wind turbine transformer comprises a primary winding configured to receive electrical power from the main transformer and a secondary winding configured to deliver electrical power to a first set of electrical components.

13. The system according to claim 12, wherein the service voltage transformer comprises a primary winding configured to receive electrical power from the busbar and a secondary winding configured to deliver electrical power to a second set of electrical components.

14. The system according to claim 9, further comprising an uninterruptable power supply configured to selectively receive electrical power from the auxiliary transformer or from the service voltage transformer.

15. The system according to claim 9, further comprising a switch or a fuse for disconnecting the service voltage transformer from the grid.

16. The system according to claim 13, wherein the second set of wind turbine electrical components is configured to be alternatively connected to the service voltage transformer or to the auxiliary wind turbine transformer using a switch.

17. A method for connecting a disconnected wind turbine main transformer to a grid, the method comprising:
connecting the grid to a primary winding of a service voltage transformer via a bus bar to supply power to a pre-charge circuit;
pre-energizing a secondary winding of the main transformer with the pre-charge circuit while a primary winding of the transformer is disconnected from the grid; and
connecting the primary winding of the main transformer to the grid when the primary winding of the transformer is substantially in phase with the grid.

18. The method according to claim 17, wherein the pre-energizing the secondary winding of the transformer comprises ramping a voltage of the secondary winding of the transformer until a predefined value is reached.

19. A wind turbine, comprising:
a generator;
one or more power converters arranged between the generator and a point of connection to a main transformer, wherein the main transformer is configured to connect a bus bar to the converters, wherein the bulbar is configured to receive electrical power from an electrical grid with a main voltage;
a pre-charge circuit configured to be connected to the bus bar through a service voltage transformer when the main transformer is disconnected from the bus bar; and
wherein the pre-charge circuit is configured to apply electrical power to a DC bus of the converter such that a secondary winding of the main transformer is pre-charged and a primary winding of the transformer is substantially in phase with the grid.

20. A system comprising:
a busbar;
an electrical grid for providing electrical power having a main voltage to the busbar;
the wind turbine according to claim 19;
a main transformer for connecting the wind turbine to the bus bar; and
a service voltage transformer for connecting the bus bar to the pre-charge circuit when the main transformer is disconnected from the bus bar.

* * * * *